UNITED STATES PATENT OFFICE.

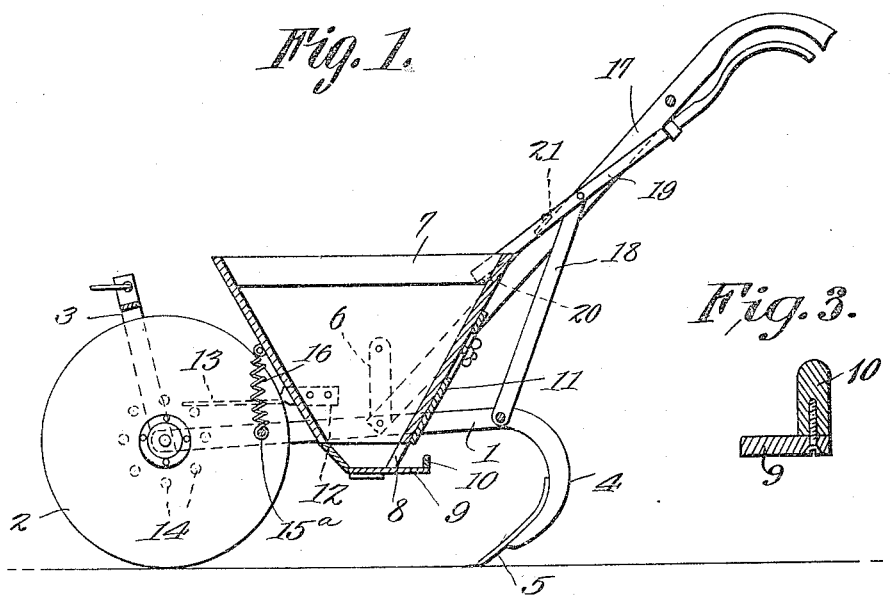
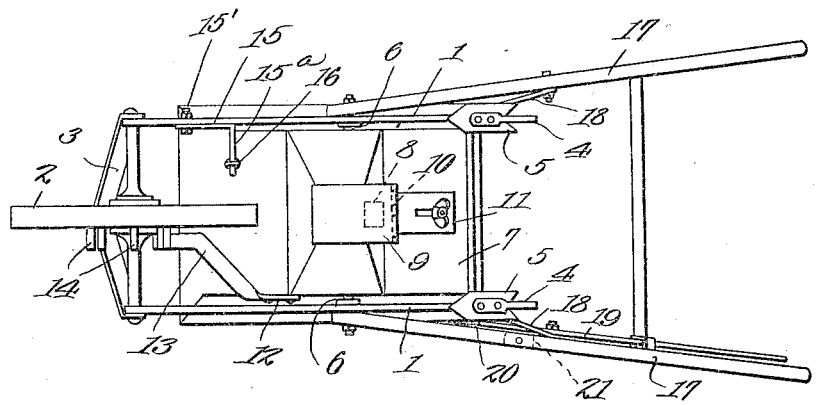

ROBERT W. STARLING, OF HAHIRA, GEORGIA.

GUANO-DISTRIBUTER.

1,142,064. Specification of Letters Patent. Patented June 8, 1915.

Application filed May 22, 1914. Serial No. 840,293.

*To all whom it may concern:*

Be it known that I, ROBERT W. STARLING, a citizen of the United States, residing at Hahira, in the county of Lowndes and State of Georgia, have invented a new and useful Guano-Distributer, of which the following is a specification.

The present invention relates to guano or fertilizer distributers, and is particularly an improvement over the guano distributer disclosed in my Patent No. 855,593, issued June 4, 1907.

The present invention contemplates the provision of a novel and improved guano distributer, wherein the jarring or vibratory motion of the hopper may be regulated, according to the various circumstances.

Another object of the present invention is to provide means for spreading the discharged guano or fertilizer laterally.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a side elevation of the machine, portions being shown in section. Fig. 2 is a bottom view of the machine. Fig. 3 is an enlarged sectional detail illustrating a means for detachably securing the lip to the extension of the bottom.

The present fertilizer distributer frame includes a pair of side beams 1, which are preferably fashioned from bars of metal, and which have a ground wheel 2 journaled between their forward ends, and a yoke 3 straddling the ground wheel 2 and connecting the forward ends of the side beams 1 to serve as a means for the attachment of the draft animal or animals. The rear ends of the beams 1 are curved downwardly into feet 4 to which the plow points or cultivator blades 5 are attached.

The side beams 1 carry standards 6 intermediate their ends, and the guano or fertilizer hopper 7 is disposed between the standards 6 and has its sides trunnioned to the upper ends of the said standards, whereby the hopper 7 may vibrate longitudinally of the machine.

The rear wall of the hopper 7 is provided with a lower discharge opening 8 immediately above the bottom and arranged between the sides of the hopper, the bottom of the hopper being closed and having a flat rearwardly projecting extension or shelf 9 wider than the opening 8, which is provided at its rear or free end with an upstanding lateral lip or flange 10 extending from one side edge of the extension 9, to the other. The flange or lip 10 is removable, in order that when it is desired to permit the discharged fertilizer to pass directly over the rear end of the extension 9, the same may be accomplished by removing the flange or lip 10. The amount of fertilizer discharged through the opening 8 is regulated by a vertically adjustable gate or valve 11 carried by the rear wall of the hopper 7.

As a means for vibrating or actuating the hopper 7, a bar or member 12 is bolted or otherwise secured to one side of the hopper above the corresponding beam 1, and is provided with a forwardly projecting and inwardly offset arm 13, which is bendable or flexible, in order that it may be bent upwardly and downwardly. The free or forward end of the arm 13 coöperates with an annular series of pins 14 carried by and projecting from one side or face of the ground wheel 2, and disposed adjacent the hub of the said ground wheel. The free or forward end of the said arm 13 is adapted to bear downwardly upon one of the rear pins 14, which move upwardly as the machine is drawn over the soil.

An angular or L-shaped bracket 15 has one arm resting against the inner side of one of the beams 1, and has its other arm 15ᵃ projecting inwardly toward the wheel 2. A clamping and pivot bolt 15' is carried by the said beam 1 and the end of the first mentioned arm of the bracket 15 is engaged to the said pivot and clamping bolt, whereby when the bolt 15' is loosened, the bracket 15 may be swung vertically, and when the said bolt is tightened, the bracket will be clamped at the position to which it has been set. The bracket 15 is arranged at that side of the hopper opposite the bar or plate 12. A coiled wire retractile spring 16 has one end connected to the inwardly projecting arm 15ª of the bracket 15, and has its other end connected to the front wall of the hopper above the bracket 15. The spring 16 tends to swing the front wall of the hopper downwardly and the upper end or mouth of the hopper forwardly, while the pins 14 in engaging the arm 13 tend to swing the mouth or upper end of the hopper rearwardly against the tension of the spring 16.

A pair of handles 17 have their lower or forward ends bolted or otherwise secured to the beams 1 intermediate their ends, braces 18 preferably connecting the intermediate portions of the handles 17 and the rear end portions of the beams 1, to steady the handles.

As a means for holding the hopper 7 stationary or in inoperative condition, a lever 19 is fulcrumed to one of the handles 17 at the upper end of the corresponding brace 18, and the lower or forward arm of the lever 19 is adapted to bear downwardly upon a pin or projection 20 carried by one side of the hopper 7 adjacent the rear wall of the hopper. A latch 21 is pivoted upon the handle 17 to which the lever 19 is fulcrumed, and is adapted to swing over the lower or forward arm of the lever 19, when the said arm is depressed to swing the hopper 7 to inoperative or idle position.

In use, after the hopper 7 has been filled with guano or fertilizer, to be distributed along the furrows in the soil, by manipulating the lever 19 so as to depress the forward or lower arm thereof, the pin or finger 20 being swung rearwardly and downwardly, will swing the front wall of the hopper upwardly, and as a consequence, the arm 13 will be raised out of engagement with the fingers or pins 14, and whereby the device may be run over the soil, without the vibration or oscillation of the hopper 7. When the discharge of the guano or fertilizer is to be started, the hopper 7 may be released, by freeing the lever 19, it being noted that the forward or lower arm of the lever 19 may be held in depressed condition, by swinging the latch 21 thereover. As soon as the lever 19 is released, the front wall of the hopper 7 will be swung downwardly, under the influence of the spring 16, and the free or forward end of the tappet arm 13 will be brought into engagement with the pins 14, and as a result, as the ground wheel 2 rotates, the tappet arm 13 will be intermittently raised, the spring 16 returning the hopper 7 and its tappet arm 13 after the disengagement of each pin 14 from the arm 13. Thus, the hopper 7 will be given a vibratory or tilting motion, as the ground wheel 2 is run along the furrow or over the soil, which will cause the guano or fertilizer to gravitate through the discharge opening 8.

Particular attention is directed to the fact that the bracket 15 may be swung or adjusted upwardly or downwardly when the bolt 15′ is loosened to vary the jars or shocks, whereby the guano or fertilizer may be discharged at the rate desired, and whereby the vibration of the hopper may be regulated according to the various qualities of fertilizer. Thus, when the fertilizer is dry and loose, the same will only need a light vibration of the hopper 7 to properly discharge the fertilizer, whereas when the fertilizer is damp or moist, it is essential that the hopper 7 be given a thorough jarring action, to loosen and discharge the fertilizer properly. When the bracket 15 is swung upwardly, the tension of the spring 16 is reduced, and when the bracket 15 is swung downwardly, the tension of the spring 16 will be increased, to increase the agitation and discharge of the fertilizer. This effect may be amplified by bending the arm 13. Especial attention is also directed to the fact that the flange or lip 10 at the rear or free end of the extension 9, causes the discharged fertilizer to be spread or fed laterally, some of the fertilizer also working over the flange or lip 10, whereby the fertilizer will be spread laterally to both sides of the furrow or path traversed by the machine. The flange or lip 10, however, may be removed, when desired, to enable the discharged fertilizer to pass directly over the free or rear end of the extension 9.

Having thus described the invention, what is claimed as new is:

1. A fertilizer distributer embodying a pair of side beams, a hopper trunnioned between the said beams and having a lower discharge means, a ground wheel journaled between the forward ends of the beams and having an annular series of pins projecting from one side, a member secured to one side of the hopper above one of the said beams and having a forwardly projecting tappet arm coöperating with the said pins, a clamping and pivot bolt carried by the other beam, an angular bracket having the end of one arm engaged to the said bolt, the said arm of the bracket bearing against the inner side of the corresponding beam, and the other arm of the bracket projecting inwardly toward the said wheel, and a coiled wire retractile spring connecting the front wall of the hopper and the inwardly projecting arm of the bracket for holding the tappet arm in engagement with the said pins.

2. A fertilizer distributer including a frame, an oscillatory hopper carried by the frame and having a bottom, the rear wall of the hopper having a discharge opening immediately above the bottom and arranged between the sides of the hopper, the bottom of the hopper having a flat rearwardly projecting extension wider than the said discharge opening, a removable upstanding lateral lip mounted upon the rear end of the said extension and extending from one side edge of the said extension to the other, and means for vibrating the hopper.

In testimony that I claim the foregoing as my own, I have hereto affixed my signature in the presence of two witnesses.

ROBERT W. STARLING.

Witnesses:
H. B. LAWSON,
G. K. JOHNSON.